I. W. COLBURN.
MACHINE FOR DRAWING SHEET GLASS.
APPLICATION FILED APR. 13, 1907.

973,002.

Patented Oct. 18, 1910.
5 SHEETS—SHEET 1.

I. W. COLBURN.
MACHINE FOR DRAWING SHEET GLASS.
APPLICATION FILED APR. 13, 1907.

973,002.

Patented Oct. 18, 1910.
5 SHEETS—SHEET 2.

UNITED STATES PATENT OFFICE.

IRVING W. COLBURN, OF FRANKLIN, PENNSYLVANIA, ASSIGNOR TO COLBURN MACHINE GLASS COMPANY, OF FRANKLIN, PENNSYLVANIA, A CORPORATION OF NEW JERSEY.

MACHINE FOR DRAWING SHEET-GLASS.

973,002.     Specification of Letters Patent.    Patented Oct. 18, 1910.

Application filed April 13, 1907. Serial No. 368,096.

*To all whom it may concern:*

Be it known that I, IRVING W. COLBURN, of Franklin, Pennsylvania, have invented a new and useful Improvement in Machines for Drawing Sheet-Glass, which improvement is fully set forth in the following specification.

This invention relates to the art of glass-making, and more particularly to the art of drawing glass in sheet form.

In my Patent No. 836,439, I have disclosed a machine and method for drawing sheet glass of uniform width free from ribs or striæ, and the present invention is designed as an improvement on the machine set forth in said patent, and particularly in connection with the means for carrying the sheet of drawn glass from the drawing chamber to the point where it is cut into sections. In addition to this feature, the present invention sets out certain improved devices for operating the carrier table and the grip bars co-acting therewith, whereby the motion of the same may be reversed to facilitate the introduction of the bait for starting the drawing operation; and also improved features in connection with the working chamber whereby provision is made for the introduction of the shafts of the revolving bodies employed for holding the sheet to its full width, as well as affording means for collecting and withdrawing any dirt or foreign matter that may be present upon the surface of the molten glass in the working chamber.

There are other features of improvement which will be specifically described herein and then pointed out in the claims.

Referring to the drawings

Figure 2:
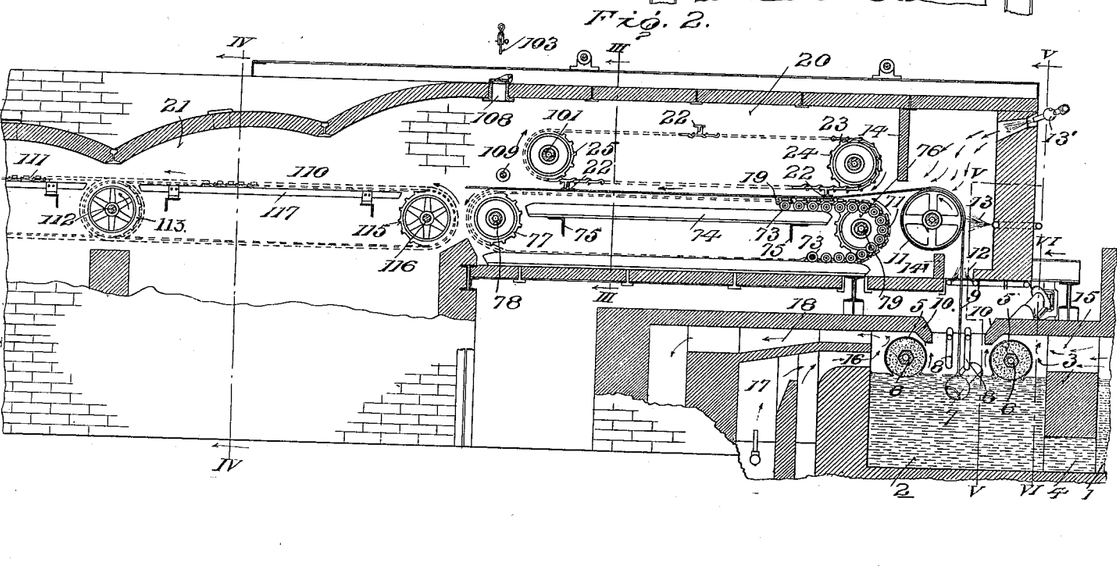
Fig. 2 is a central longitudinal vertical section of Fig. 1.

Referring to Fig. 2, 1 is a melting furnace, 2 a working chamber, 3 a separating bridge wall, and 4 a communicating passage between the furnace and working chamber. Rolls 5, 5 of refractory material are mounted on hollow shafts 6, 6, which have bearings on the exterior portion of the machine. 7, 7 are revoluble spheres for holding the sheet of glass to uniform width, and 8, 8 are shields interposed between the sheet of glass 9 and the rolls 5, 5, to protect said sheet from the radiated heat of the rolls and the heated gases of combustion that would pass over the rolls from the rear and between said rolls and the lips 10, 10 on the top of the working chamber.

11 is a bending roll over which the sheet of glass is bent as it is drawn, and 12, 13 13' are burners for heating the glass in order that it may be easily bent over the roll, while 14 is a depending bridge wall which acts to deflect the heat from the burners 12 down upon the sheet of glass.

Heat is delivered to the rear of one of the rolls 5 through the flue 15 leading from the melting furnace 1 and to the rear of the other roll through flues 16 leading from the combustion chamber 17, the products of combustion being drawn off through flue 18.

All of the foregoing parts are substantially such as disclosed in my aforesaid Patent No. 836,439, and need not, therefore, be more fully referred to herein.

The sheet of glass after passing over the bending roller 11 rests upon a carrier table 19, and is gripped for the purpose of pulling the sheet and advancing the same through the chamber 20, and through the annealing oven 21, by means of grip bars 22 carried on endless chains 23 passing over sprockets 24 and 25.

The present improvements relate more specifically to the detailed means of driving the rollers 5, 5 and the side-holding spheres 7, 7, the carrier 19 and the chains 23 bearing the grip bars 22, and in addition thereto, the detailed construction of the carrier table and of the carrier or supports for the sheet of glass 9 after it leaves the chamber 20 and is advanced into the annealing chamber 21.

The invention also relates to certain other specific details of construction which will be more fully hereinafter described and then claimed.

Figure 1:
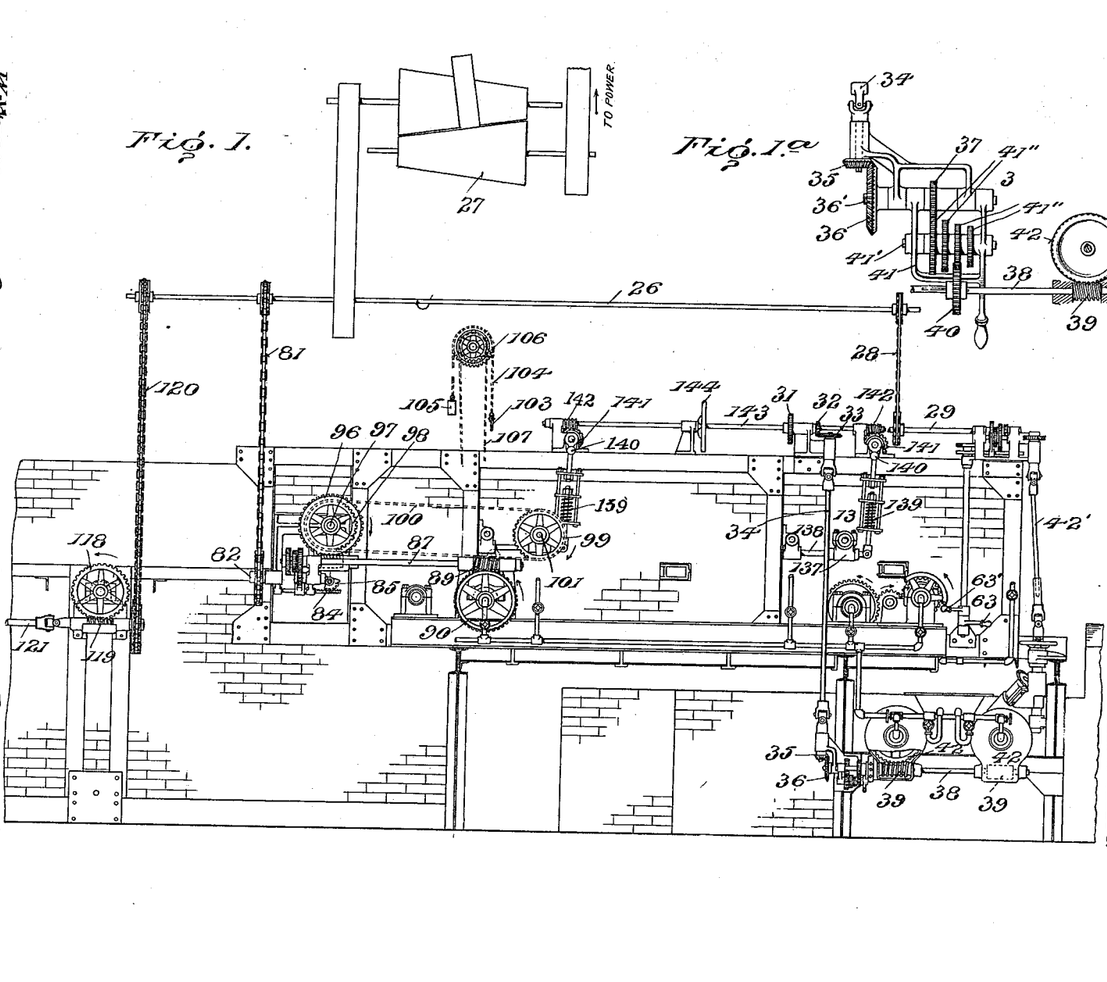
—Figure 1 is a side elevation of the forward part of the machine showing the mechanism for applying power to the several parts to operate them, and Fig. 1ª is an enlarged detail.
Figure 10:
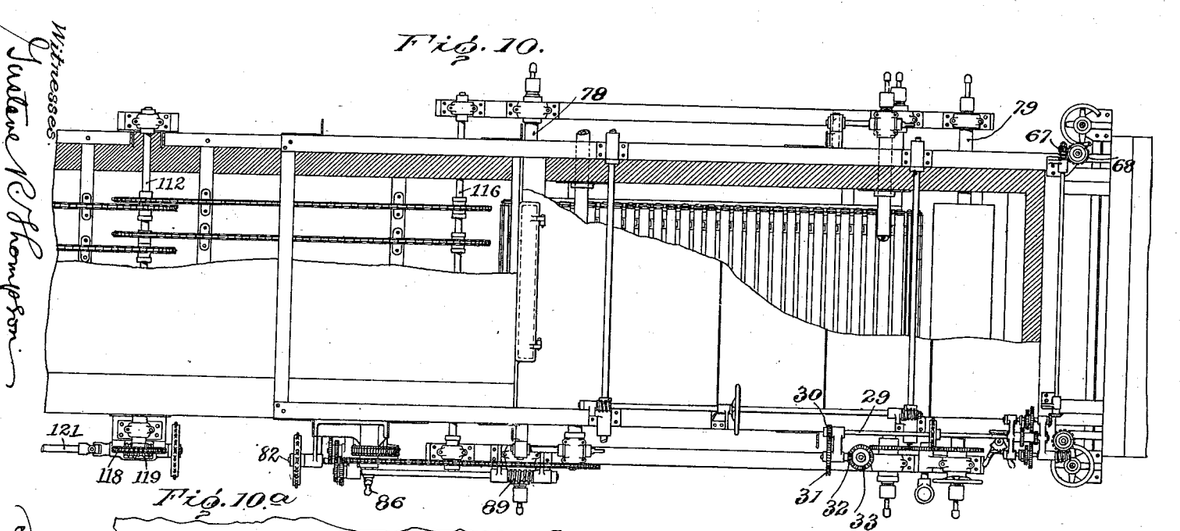
Fig. 10 is a broken plan view of the machine showing the operating parts, and Fig. 10ª is an enlarged detail thereof.
Figure 10A:
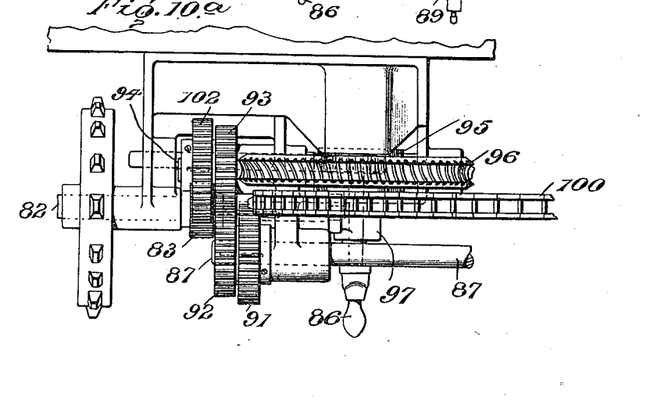
Figure 11:
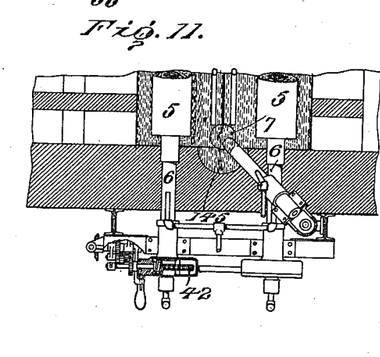
Fig. 11 is a horizontal sectional broken detail of the working chamber showing the bearings for the rib-annihilating rolls, the side-holding sphere, and a part of the change-speed mechanism for said rolls.

Referring to Figs. 1 and 10, 26 is a main shaft receiving power from any suitable source, as from friction cone pulley 27, and connected by sprocket chain 28 to shaft 29 turning in suitable bearings, and having keyed thereto a pinion 30 gearing with another pinion 31 on a stub shaft whose other end bears beveled pinion 32 gearing with beveled pinion 33 on a universally jointed shaft 34, having on its lower end beveled pinion 35 (see Fig. 1$^a$) engaging pinion 36 on one end of a shaft 36′, to which is keyed pinion 37. On a shaft 38 having right and left worms 39 is pinion 40 keyed to, but slidable along, said shaft. Any suitable change-speed gearing, as for example that shown in Fig. 1$^a$, is employed for connecting the pinions 37 and 40, to the end that shaft 38 may be driven at various speeds. This consists of a yoke 41 swinging on shaft 36′ and affording bearing for a shaft 41′ carrying pinions 41″ of different diameters. By swinging the yoke 41 away from pinion 40, the latter may be slid along shaft 38 into position to engage any one of the pinions 41″ according to the speed desired. The worms 39, 39 engage worm wheels 42, only one of which is shown in Fig. 1, secured to the shafts 6 of the rollers 5 (see Fig. 11). Since the worms 39, 39 are reversely inclined worms, the two rollers 5, 5 are revolved in opposite directions, and the speed of revolution of the said rollers may be adjusted by means of the change-speed gearing.

Figures 5, 6, 7, 8, 8A, 8B, 9:
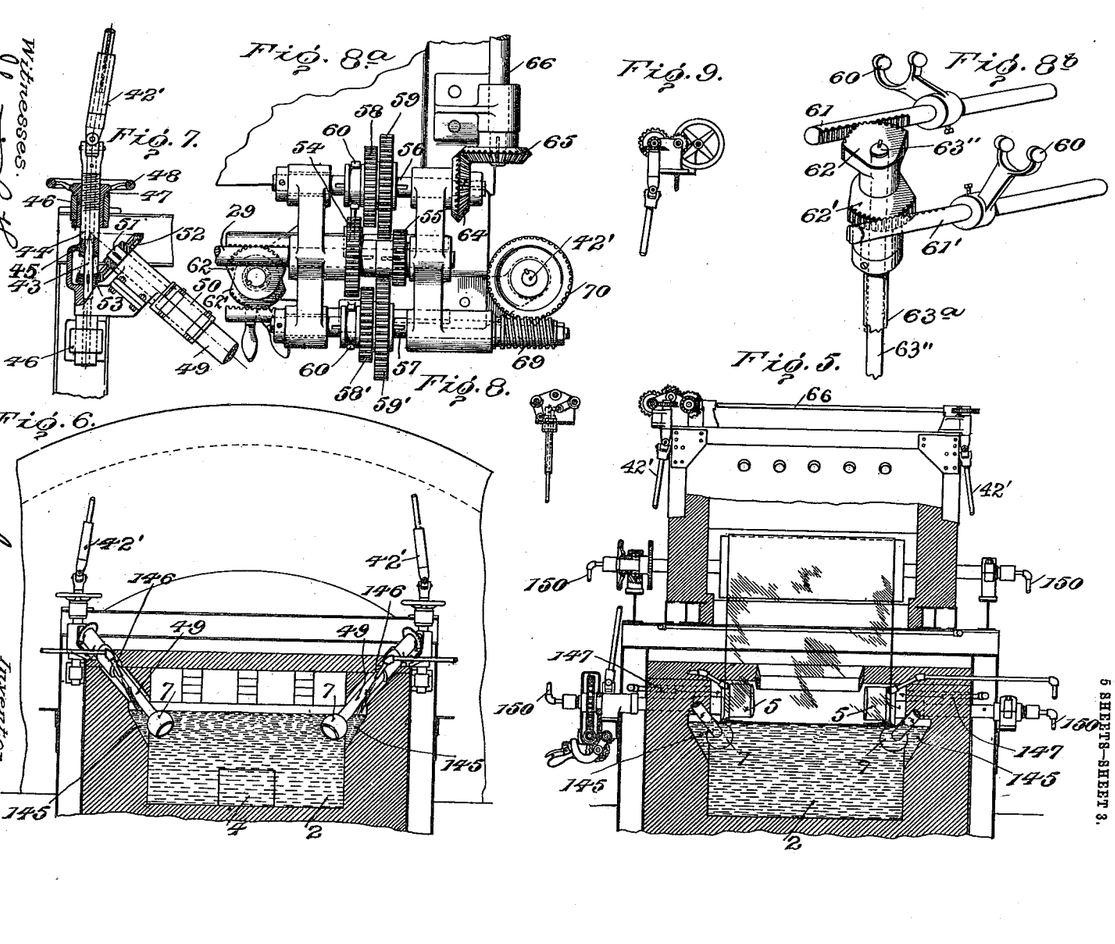
Fig. 5 is a vertical section on the line V—V of Fig. 2.
Fig. 6 is a section on the line VI—VI, all of the sections looking in the direction of the arrows.
Fig. 7 is a broken sectional detail of parts operating the side-holding rolls.
Fig. 8 is a transverse section showing parts of the reversing mechanism connected with the side-holding rolls or spheres, and Figs. 8ª and 8ᵇ are enlarged details of the same.
Fig. 9 is a broken detail showing the driving mechanism for the rib-annihilating rolls.

For the purpose of driving the side-holding spheres 7, 7, power is transmitted from shaft 29 through suitable gearing to universally jointed shafts 42′ (see Figs. 1, 6, 7, 8$^a$ and 10), the lower end 43 of which turns in a sleeve 44, Fig. 7, which sleeve is supported in a vertically sliding bracket 45 carried in brackets 46 bolted to the framework of the machine. Surrounding the sleeve 44, which is exteriorly screw threaded, is a nut 47 having hand-wheel 48 secured thereto. By turning the hand-wheel, the sleeve 44, and with it the bracket 45, can be elevated and depressed. The shank 49 of the spheres 7 is clamped at 50 to a shaft 51 also taking bearing in the vertically sliding bracket 45, and having on its upper end a beveled gear 52 engaging beveled gear 53 on the lower end of the shaft 43. By this construction revolutions are imparted to the spheres 7, and at the same time it is rendered possible to vertically adjust the spheres to determine the depth of their immersion in the molten glass, without interfering with the meshing of the gears 52 and 53 whereby said spheres are driven. These two spheres, of course, are driven in opposite directions, and power is imparted to the shafts 42′ from the shaft 29 by the following mechanism. Keyed to the shaft 29 are two gears 54 and 55 (see Figs. 8$^a$ and 10), and slidably mounted on two parallel shafts 56 and 57 are two gears 58 and 59 and 58′ and 59′, respectively. Forks 60 (see Figs. 8$^a$ and 8$^b$) engage the hubs of gears 58 and 59 and 58′ and 59′, which forks are carried and controlled by racks 61 and 61′, Fig. 8$^b$, controlled by toothed segments 62 and 62′ operated by levers 63, 63′ (Fig. 1) on rod 63″ and pipe 63$^a$. By throwing large gears 59, 59′ into mesh with the small gear 55 on the shaft 29, the speed can be reduced, and by throwing the small gears 58, 58′ into mesh with the larger gear 54, the speed can be increased. Shaft 56 has on one end a beveled pinion 64 engaging beveled pinion 65 on shaft 66, bearing at its other end worm 67, Fig. 10, engaging worm-wheel 68 at the upper end of one of the shafts 42′. The other shaft 57, Fig. 8$^a$, has on its exterior end a worm 69 engaging worm-wheel 70 on the top of the other shaft 42′. By this construction the speed of the revolutions of the spheres 7 can be adjusted, and the depth to which the spheres are immersed in the molten glass can also be controlled.

Referring to Fig. 2, the links of the endless carrier chains 19 have each fastened thereto transverse bars 71, which bars, arranged in series on the chains, constitute an endless carrier table for the support of the sheet of glass. In order to support the upper portion of this chain in substantially level and horizontal position, the ends of the bars 71 on the chains are provided with rollers 73, which rollers, during the time that the glass rests upon the carrier, travel upon and are supported by longitudinally extending bars 74, supported on transverse beams 75, carried by the walls of the chamber 20 (see Figs. 2 and 3.) By this means all sagging of the carrier table is avoided. The chains 19 supporting the carrier table pass over sprockets 76, 77 mounted on hollow shafts 78, 79, Fig. 2, which shafts have their bearings exterior to the chamber 20, said bearings being supported by eye-beams 80, Fig. 3, on the framework of the machine. For the purpose of driving the carrier table, power is applied to the exterior end of the rear shaft 78.

Referring to Figs. 1, 10 and 10ª, 81 is a drive-chain coming from shaft 26, and driving a shaft 82 having slidably keyed thereto a spur pinion 83, which pinion is controlled in its sliding movement by a fork carried on a rack 84 operated by a toothed segment 85, Fig. 1, controlled by a hand-lever 86 (see Fig. 10).

87 is a shaft having a worm 89 engaging worm-wheel 90 on the end of shaft 78. On the other end of shaft 87 is a gear 91 with which the gear 83 may mesh to drive the worm 89 in one direction, when the machine is in operation to draw a sheet of glass. There is also keyed on shaft 87 a gear 92 meshing with a gear 93 on a shaft 94 having worm 95 driving worm wheel 96 on stub shaft 97. Sprocket wheel 98 is driven by worm wheel 96 and in turn drives sprocket wheel 99 through sprocket chain 100. Sprocket wheel 99 is keyed to the exterior end of shaft 101 which has sprockets 25 keyed thereto for driving grip chains 23 carrying the grip bars 22 (see Fig. 2).

When it is desired to reverse the movement of the carrier table, gear 83 is slid along shaft 82 out of engagement with gear 91 and into engagement with gear 102 (Fig. 10ª) keyed to shaft 94, whereupon shaft 87 is driven through gears 83, 102, 93 and 92, instead of directly through engagement of gear 83 with gear 91.

Referring to Fig. 1, 103 is the bait attached to a chain 104 wound around a suitable drum and counter-balanced by a weight 105. On the exterior projecting end of the drum shaft is a sprocket wheel 106 over which passes a depending sprocket chain 107, and by means of which an operative can turn the shaft to wind up or unwind the chain 104 to which the bait is attached. For the purpose of permitting the bait 103 to enter the drawing chamber 20 (see Fig. 2), an opening 108 is provided in the roof of the chamber, and when the bait is permitted to descend through the said opening, it falls upon the carrier table and, the direction of said table being reversed so as to move in the opposite direction from that indicated by the arrows in Fig. 2, and the grip bars 22 being elevated as hereinafter described, the bait is carried forward by the carrier table, and passed by means of suitable tools inserted in a forward opening in the wall of the chamber 20 over the drum 11, and permitted to descend into the molten glass in the working chamber 2. It will thus be seen that the reversal of the movement of the carrier table by means of the sliding gear 83, greatly facilitates the initial operation of inserting the bait into the molten glass. The bait having been slowly elevated through the operation of the sprocket chain 107 or other suitable means, the sheet of glass is drawn up over the roller 11 and onto the carrier table, the chain 104 being guided in its movement by an idler roller 109, Fig. 2. When the bait has reached a position to the rear of the roller 109, it may either be detached from the glass or from the chains 104, and the grip bars being lowered and the gear wheel 83 slipped on the shaft 82 so as to engage with the gear 91, the drawing of the glass will proceed automatically with the carrier table and the grip bars moving in the directions indicated by the arrows in Fig. 2.

Figure 4:
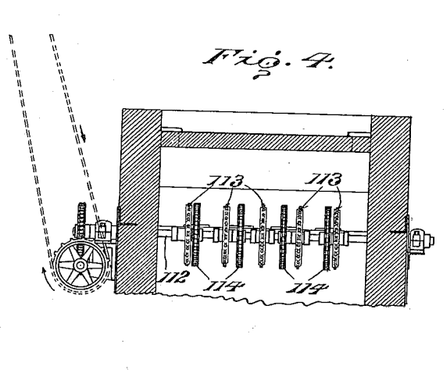
Fig. 4 is a transverse vertical section on the line IV—IV of Fig. 2.
Figure 12:
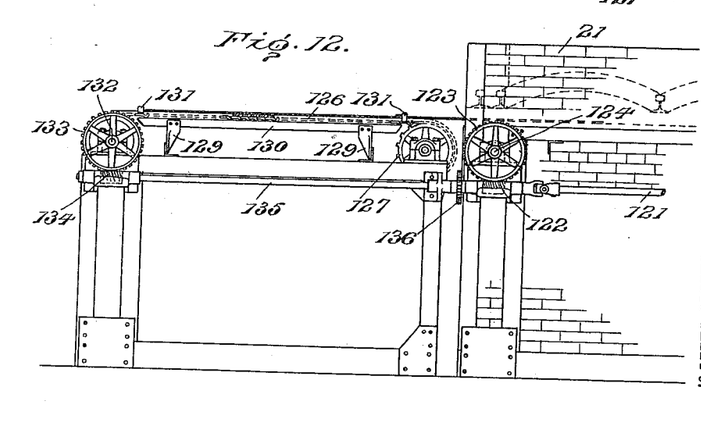
Fig. 12 is a side elevation, Fig. 13 an end elevation, and Fig. 14 a top plan view, partly broken away, of the rear end of the machine showing more of the construction and operation of the cutting table.
Figure 14:
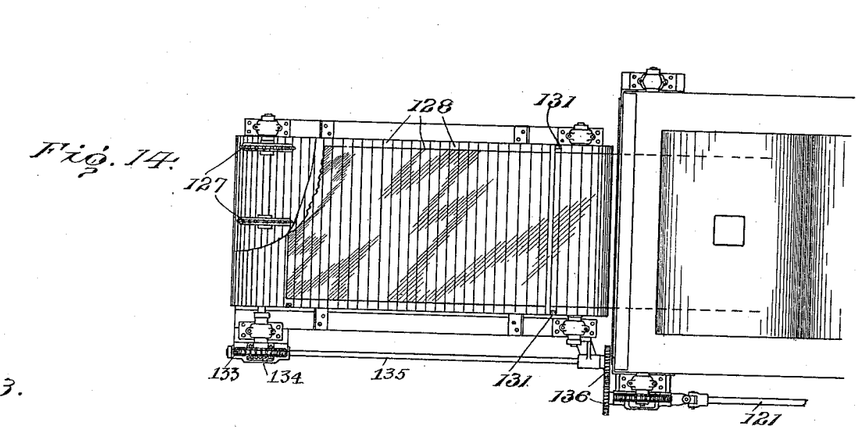

As the sheet of glass is advanced from the carrier table in the chamber 20, it is received by another section of the carrier in the chamber 21. This carrier is composed of two or more sections 110 and 111, the construction of which will be best understood by reference to Figs. 2, 4 and 10. Each of the sections 110 and 111 is composed simply of a series of parallel sprocket chains passing over sprocket wheels and driven at the same rate of speed as the carrier table section in chamber 20. In order that there may be no break between the sections 110 and 111, the sprocket wheels supporting the chains of these sections at their adjacent ends are all arranged on the same shaft 112. The sprocket wheels 113 which support the chains constituting the section 110, are keyed to the shaft 112, while the sprocket wheels 114 over which the chains of section 111 pass are loose on the shaft 112. The sprocket chains constituting the section 110 pass from the sprocket wheels 113 over sprocket wheels 115 turning loosely on a shaft 116, and in order that there may be no sagging of these chains, they are supported in a horizontal position by ways or bars 117, as will be clearly understood by an inspection of Fig. 2. For the purpose of driving shaft 112, the exterior projecting end thereof is provided with a worm wheel 118 engaged by worm 119 (see Fig. 1) driven by sprocket chain 120 leading to shaft 26. Worm 119 is coupled by flexible shaft 121, Figs. 1, 12 and 14, to a worm 122 engaging worm wheel 123 on the exterior end of shaft 124, to which shaft are keyed sprocket wheels over which the chains constituting the section 111 pass, and are driven in a manner precisely similar to that by which the chains of section 110 are driven by the sprocket wheels 113 on the shaft 112. As the worms 119 and 122 and the worm wheels 118 and 123 are exactly similar, the two shafts 112 and 124 are driven at the same rate of speed.

Figure 13:
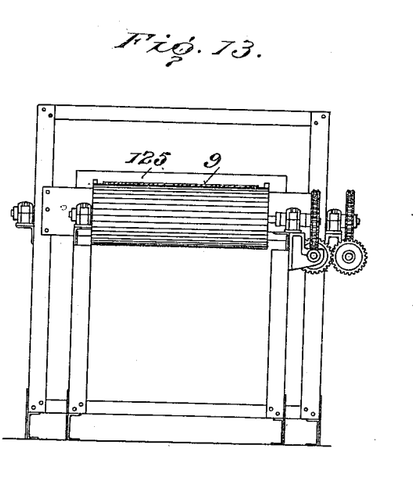

At the time when the glass passes from the carrier section in the chamber 20 onto the section 110 of the carrier, it is hot enough so as not to be readily broken, and yet is of sufficient firmness to readily bridge over the space between the carrier table and the section 110. As it advances through the chamber 21, however, it gradually cools and becomes more and more frangible, and it has therefore been found desirable to have the carrier of such a continuous character that no break or opening shall occur after the glass leaves the chamber 20, and it will be observed that the two sections 110 and 111 are so constructed and operated that they in effect constitute one continuous and unbroken carrier. As the sheet passes out of the rear end of the chamber 21 through the opening 125, Fig. 13, it is received on an endless carrier table where it is cut into sections. This carrier table consists of sprocket chains 126 turning over sprocket wheels 127 and supporting transverse slats or cross-bars 128, which taken together, constitute a continuous and level surface or table. Attached to the framework of the machine are brackets 129, Fig. 12, carrying horizontal bars 130 which support the chains 126 of the carrier table, thereby insuring that it shall always remain in a perfectly level and horizontal position. Attached to the chains 126 at suitable intervals and so as to project above the surface of the table, are oppositely disposed lugs 131 which constitute abutments against which a ruler may be laid, and along which a diamond or other cutting tool may be passed for severing the sheet into sections while it is in motion along the cutting table. After being cut, the section is received by an off-bearer at the end of the machine.

For the purpose of driving the cutting table, shaft 132, to which is geared the sprocket wheels 127, has keyed thereto a worm wheel 133 engaging worm 134 which is connected by shaft 135 and gears 136 to the worm 122, so that it is driven at the same rate of speed as said worm. It will therefore be observed that the carrier sections for the sheet of glass beginning with the carrier table composed of the bars 71 in the chamber 20, sections 110 and 111 in the chamber 21, and the cross bars 128 constituting the cutting table, all move at the same rate of speed.

For the purpose of lifting the grip bars 22 out of contact with the carrier table in the chamber 20 for inserting the bait 103, as hereinbefore described, the shafts supporting the sprocket wheels 24 and 25 project through openings in the walls of the chamber 20 and have their bearings in boxes 137 carried on rods 138, pivoted at one end to the framework of the machine and at the other end to spring links 139 depending from cranks 140 keyed to shafts on which there are worm wheels 141 engaging worms 142 on a shaft 143 operated by hand-wheel 144, all as more fully described in my patent aforesaid.

Referring to Figs. 5 and 6, it will be observed that in the upper portion of the walls of the working chamber 2, there are provided recesses 145, and that the shanks 49 of the spheres 7, 7 are located in said recesses. In addition to affording suitable space for conveniently placing the shanks 49, these recesses 145 constitute, as it were, bays or inlets wherein the revolving action of the spheres gradually causes any dirt or floating foreign particles that may be in the molten glass to collect, and from which they may be readily removed. It will be observed that for the purpose of keeping the shanks 49 of the spheres free from glass that might collect thereon and serve to choke the openings through which the shanks are inserted, burners 146 are provided to direct jets of flame down along the shanks and melt off any glass that might tend to collect thereon. Similar burners are also provided, as shown at 147, Fig. 5, for preventing the accumulation of glass upon the ends of the rollers 5, 5.

From the foregoing, it will be seen that simple and compact mechanisms are provided for driving the various parts of the machine, and particularly for changing the speed at which the rollers 5, 5 and the spheres 7, 7 are driven, and also for adjusting the height of the spheres in the molten glass. Moreover, the operative can at will reverse the direction of movement of the section of the carrier in the chamber 20, and can throw the gripping bars 22 into and out of operation with perfect facility. Furthermore, the carrier sections 110, 111 afford a perfectly level and unbroken carrier by which the sheet of glass is advanced through the chamber 21 to the cutting table, and all of these parts move at a uniform rate of speed, and the construction of the working chamber is such that dirt floating upon the surface may be readily collected in recesses 145 and removed therefrom.

In addition to the depending wall 14 in chamber 20, as shown in my patent aforesaid, there is provided beneath the roller 11 an upwardly projecting wall 149, Fig. 2, and the bending roller 11 is mounted in the space between the depending wall 14 and the upwardly projecting wall 149. The effect of these two walls is to direct the heat coming from the various burners projecting into the forward chamber thus formed against the glass, so that it will be in the best possible condition for being bent over the bending roller 11.

Figure 3:
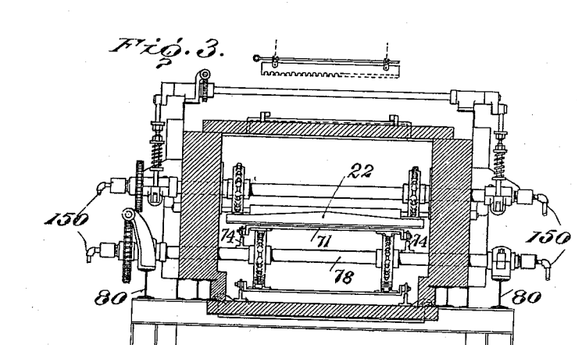
Fig. 3 is a transverse vertical section on the line III—III of Fig. 2.

It will be understood that all of the shafts of the various parts which project within the heated chambers and are subjected to a high degree of heat, are hollow, and are provided with means for circulating a suitable cooling fluid, as water, therethrough, such means being shown at 150 in Figs. 3 and 5.

What I claim is:—

1. In a glass working machine, the combination of means for drawing a sheet of glass of uniform width, a carrier for receiving the drawn sheet and advancing it through the machine, said carrier consisting of a plurality of endless carrier sections with adjacent ends, means for driving said sections, and longitudinally extending horizontal supports for each section whereby the carrier sections are maintained level.

2. In a glass working machine, the combination of means for drawing a sheet of glass of uniform width, a sectional carrier for receiving the drawn sheet and advancing it through the machine, each section consisting of endless chains passing over supporting and driving sprocket wheels, and longitudinally extending supports for maintaining the chains level between the sprockets.

3. In a glass working machine, the combination of means for drawing a sheet of glass of uniform width, a sectional carrier for receiving the drawn sheet and advancing it through the machine, one of said sections being composed of two parallel endless sprocket chains carrying transverse bars constituting a table, and the other section consisting of a plurality of parallel chains, and means for driving both sections at the same speed.

4. In a glass working machine, the combination of means for drawing a sheet of glass of uniform width, a sectional carrier for receiving the drawn sheet and advancing it through the machine, one of the sections consisting of sprocket chains having antifrictional bearings traveling on horizontal supports between the sprockets, and means driving the said sections at the same speed.

5. In a glass working machine, the combination of sheet glass drawing mechanism, a continuously moving carrier receiving and advancing the drawn sheet through the machine, a cutting table consisting of endless chains supporting transverse slats constituting the surface of the table, and means driving said drawing mechanism, carrier and cutting table at the same speed.

6. In a glass working machine, the combination of means for drawing a sheet of glass, a carrier table on which the sheet rests as drawn, a bait normally supported above the machine at the rear end of said table upon which the bait may be lowered, and means for driving the said table both backward and forward.

7. In a glass working machine, the combination of means for drawing a sheet of glass, a carrier table receiving the sheet as drawn, means driving the table in a direction to advance the sheet through the machine, means reversing the direction of movement of the table at will, and a bait suspended above said table and upon which it may be lowered at will.

8. In a glass working machine, the combination of a working chamber containing molten glass and provided with two side chambers or recesses, means for drawing sheet glass from said working chamber, refractory bodies movable in the molten glass to hold the sheet to uniform width, said bodies having shanks extending upward and outward through said side chambers or recesses, and means for operating said bodies.

9. In a glass working machine, the combination of sheet glass drawing mechanism, a shaft having sprocket wheels secured to turn therewith and also other sprocket wheels turning loosely thereon, a second shaft having sprocket wheels loose thereon, chains passing over said latter wheels and the wheels secured to turn with the first-mentioned shaft, a third shaft having sprocket wheels secured to turn therewith, chains passing over said last-mentioned wheels and the loose wheels on said first-mentioned shaft, and means driving said first and last-mentioned shafts.

10. In a glass working machine, the combination of sheet glass drawing mechanism including rib-annihilating rolls and bodies movable in the molten glass to hold the sheet to uniform width, with a source of power, and change speed connections between said source of power and said rolls and said bodies.

11. In a glass working machine, the combination of sheet glass drawing mechanism, with a continuously moving carrier receiving the sheet as drawn, a continuously moving cutting table receiving the sheet from the carrier, and means driving the drawing mechanism, the carrier and the cutting table at the same speed.

12. In a glass working machine, the combination of sheet glass drawing mechanism, with a continuously moving carrier receiving the sheet as drawn, a continuously moving cutting table receiving the sheet from the carrier, and oppositely disposed ruler receiving abutments carried by said table, whereby a ruler may be applied to the sheet and the same be cut during its movement on the table.

13. In a glass working machine, the combination of a heated chamber, sheet glass drawing mechanism located in one end of said chamber, a continuous carrier leading through said chamber to the exit end thereof, ventilating openings in the wall of said chamber, a continuously moving cutting table at the exit end of the chamber, and means driving the drawing mechanism, the carrier and the cutting table all at the same speed.

14. In a glass working machine, the combination of a receptacle for molten glass having two side recesses, means for drawing a sheet of glass from said receptacle, means for holding the sheet of glass to full width and having portions lying in said recesses, and burners directing jets of flame into said receptacles along said portions.

15. In a glass working machine, the combination of a receptacle for molten glass having two side recesses, means for drawing a sheet of glass from said receptacle, revoluble spheres for holding the sheet of glass to full width and having shanks lying in said recesses, and burners directing jets of flame along said shanks and against the surface of the glass in the recesses.

16. In a glass working machine, the combination of a receptacle containing molten glass, means including a carrier table and grip-bars for drawing a sheet of glass from said receptacle, two worm shafts for operating said table and grip bars respectively, intermeshing gears on said shafts, a power shaft, and a gear on said power shaft meshing with a gear on one of said worm shafts.

17. In a glass working machine, the combination of a receptacle containing molten glass, means including a carrier table and grip bars for drawing a sheet of glass from said receptacle, two worm shafts for operating said table and grip-bars respectively, intermeshing gears on said shafts, a power shaft, and a sliding gear on said power shaft and adjustable to engage a gear on either of said worm shafts at will.

In testimony whereof I have signed this specification in the presence of two subscribing witnesses.

IRVING W. COLBURN.

Witnesses:
BESS LOUISE BLACK,
WM. B. GRIFFEN.